US009817670B2

(12) United States Patent
Gupta et al.

(10) Patent No.: US 9,817,670 B2
(45) Date of Patent: *Nov. 14, 2017

(54) FRAMEWORK TO PROVIDE TIME BOUND EXECUTION OF CO-PROCESSOR COMMANDS

(71) Applicant: International Business Machines Corporation, Armonk, NY (US)

(72) Inventors: Nitin Gupta, Bangalore (IN); Mehulkumar J. Patel, Bangalore (IN); Deepak C. Shetty, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 404 days.

This patent is subject to a terminal disclaimer.

(21) Appl. No.: 14/105,349

(22) Filed: Dec. 13, 2013

(65) Prior Publication Data

US 2015/0169327 A1    Jun. 18, 2015

(51) Int. Cl.
*G06F 15/76*    (2006.01)
*G06F 9/46*    (2006.01)
(Continued)

(52) U.S. Cl.
CPC .......... *G06F 9/3877* (2013.01); *G06F 9/3879* (2013.01); *G06F 9/547* (2013.01);
(Continued)

(58) Field of Classification Search
CPC .. G06F 9/93877; G06F 9/3877; G06F 9/3879; G06F 9/547; G06F 2009/3883;
(Continued)

(56) References Cited

U.S. PATENT DOCUMENTS

| 5,349,682 A * | 9/1994 | Rosenberry | G06F 9/3001 |
| | | | 712/31 |
| 6,219,789 B1 * | 4/2001 | Little | G06F 7/588 |
| | | | 726/34 |

(Continued)

FOREIGN PATENT DOCUMENTS

| JP | 57000761 A | 1/1982 |
| JP | 04033138 A | 2/1992 |

(Continued)

OTHER PUBLICATIONS

International Application No. PCT/JP2014/004950, Patent Cooperation Treaty, International Searching Authority, Written Opinion, dated Nov. 18, 2014, filed Sep. 26, 2014.

(Continued)

*Primary Examiner* — Daniel Pan
(74) *Attorney, Agent, or Firm* — Gilbert Harmon, Jr.

(57) ABSTRACT

When a main processor issues a command to co-processor, a timeout value is included in the command. As the co-processor attempts to execute the command, it is determined whether the attempt is taking time beyond what is permitted by the timeout value. If the timeout is exceeded then responsive action is taken, such as the generation of a command timeout type failure message. The receipt of the command with the timeout value, and the consequent determination of a timeout condition for the command, may be determined by: the co-processor that receives the command, or a watchdog timer that is separate from the co-processor. Also, detection of co-processor hang and/or hung co-processor conditions during the time that a co-processor is executing a command for the main processor.

9 Claims, 8 Drawing Sheets

(51) Int. Cl.
*G06F 9/38* (2006.01)
*G06F 9/54* (2006.01)
*G06F 9/48* (2006.01)

(52) U.S. Cl.
CPC .... *G06F 9/4881* (2013.01); *G06F 2009/3883* (2013.01); *G06F 2209/543* (2013.01)

(58) Field of Classification Search
CPC . G06F 2209/543; G06F 9/4881; G06F 9/4843
USPC .......................................... 712/34; 718/102
See application file for complete search history.

(56) References Cited

U.S. PATENT DOCUMENTS

| | | | |
|---|---|---|---|
| 6,584,587 B1* | 6/2003 | McDermott | G06F 3/14 714/23 |
| 6,742,139 B1 | 5/2004 | Forsman et al. | |
| 7,167,971 B2* | 1/2007 | Asaad | G06F 8/443 712/34 |
| 7,200,741 B1 | 4/2007 | Mine | |
| 7,340,596 B1* | 3/2008 | Crosland | G06F 1/24 713/1 |
| 7,886,129 B2 | 2/2011 | Hudepohl et al. | |
| 8,108,838 B2 | 1/2012 | Asaad et al. | |
| 8,122,229 B2 | 2/2012 | Wallach et al. | |
| 8,250,412 B2 | 8/2012 | Cheng et al. | |
| 2005/0081115 A1 | 4/2005 | Cheng et al. | |
| 2008/0177990 A1 | 7/2008 | Banerjee et al. | |
| 2008/0235493 A1* | 9/2008 | Fortier | G06F 9/3867 712/31 |
| 2009/0160867 A1 | 6/2009 | Grossman | |
| 2009/0282413 A1 | 11/2009 | Cialini et al. | |
| 2010/0162042 A1 | 6/2010 | Inoue et al. | |
| 2011/0214012 A1 | 9/2011 | Bancel et al. | |
| 2012/0075314 A1* | 3/2012 | Malakapalli | G06T 1/20 345/522 |
| 2012/0266165 A1* | 10/2012 | Cen | G06F 9/4856 718/1 |
| 2015/0169328 A1* | 6/2015 | Gupta | G06F 9/3877 712/34 |

FOREIGN PATENT DOCUMENTS

| | | |
|---|---|---|
| JP | 2006110150 A | 4/2006 |
| JP | 2007219937 A | 8/2007 |
| JP | 2009026182 A | 2/2009 |

OTHER PUBLICATIONS

International Application No. PCT/JP2014/004950, Patent Cooperation Treaty, International Search Report, filed Sep. 26, 2014.
U.S. Appl. No. 14/310,283 entitled "Framework to Provide Time Bound Execution of Co-Processor Commands", filed Jun. 20, 2014.
"Important Product Information", Product: Series 90*—30 Programmable Coprocessor Modules, Firmware Version 4.05, Jan. 19, 2010, pp. 1-5, <http://support.ge-ip.com/support/resources/sites/GE_FANUC_SUPPORT/content/live/DOCUMENT/0/DO691/en_US/GFK0494Y.pdf>.

* cited by examiner

FRAMEWORK TO PROVIDE TIME BOUND EXECUTION OF CO-PROCESSOR COMMANDS

FIELD OF THE INVENTION

The present disclosure relates generally to the field of processor commands, and more specifically to processor commands issued to co-processors.

BACKGROUND OF THE INVENTION

Modern general-purpose super scalar processors, often include: (i) a main processor; and (ii) special co-processors, which are used to off-load some computation intensive work. The co-processor performs specialized functions, independent of the main processor. Typical examples of special functions are high-end graphics processing, encryption/decryption and compression/decompression. Co-processors can be attached to a main processor in many different ways, such as: (i) attaching them to processor interconnect bus; (ii) by placing them in industry standard IO (input/output) bus slots (for example, PCIe (Peripheral Component Interconnect Express) IO slot); and/or (iii) by connecting them to main processor using any other custom bus.

Generally, co-processors rely on the main processor for work assignments. These work assignments come in the form of a request sent from the main processor, and use a co-processor command block in the main memory. The work assignment initiates and directs the co-processor to take a specific action. The co-processor reads all the inputs from the co-processor command block and performs the requested operation. An example of a command will be where the user wants to encrypt a certain amount of plain text using an encryption key and would request the co-processor to carry out the encryption task. The plain text and the encryption key can be passed as inputs to the co-processor while co-processor would produce encrypted text as output. The main processor, in the meantime, can continue to process other tasks. The main processor can program the co-processor to be effectively notified of the completion status of work assigned in one of two possible ways: (i) when the co-processor has finished the requested work, it raises an interrupt to signal completion of the required operation; or (ii) the main processor polls the co-processors for status of work. In either case, the main processor, on receiving the completion status, reads the output and assigns more work to the co-processor.

In current methods of issuing processor commands, there is no maximum time limit given for the co-processor to finish assigned work. In order for the main processor to know the co-processor command execution status, the main processor can either poll the status of the co-processor command or process the co-processor interrupt. If the co-processor command is slow to complete, the main processor has no way to know if the co-processor is just taking additional time to complete the work assigned, or if the co-processor operation is not performing the required task, which is a condition that those of skill in the art refer to as "hung."

SUMMARY

According to an aspect of the present invention, there is a method for processing a command in a processor set including a main processor and a first co-processor. The method includes the following steps (not necessarily in the following order): (i) sending, by the main processor to the first co-processor, a command; (ii) detecting an execution problem condition corresponding to at least one of the following: (a) insufficient progress in executing the command by the co-processor, or (b) time being taken to execute the command by the co-processor exceeds a timeout value included in the command; and (iii) sending, to the main processor, a command execution problem indication responsive to detection of the execution problem condition.

According to a further aspect of the present invention, a processor set includes a main processor and a first co-processor. The processor set further includes the following machine logic: (i) first machine logic set structured and/or programmed to send, by the main processor to the first co-processor, a command; (ii) second machine logic set structured and/or programmed to detect an execution problem condition corresponding to at least one of the following: (a) insufficient progress in executing the command by the co-processor, or (b) time being taken to execute the command by the co-processor exceeds a timeout value included in the command; and (iii) third machine logic set structured and/or programmed to send, to the main processor, a command execution problem indication responsive to detection of the execution problem condition.

DETAILED DESCRIPTION

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
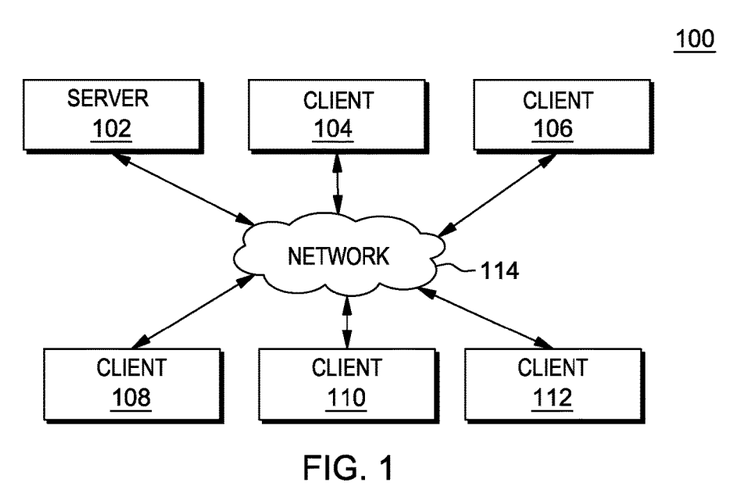
FIG. 1 is a schematic view of a first embodiment of a networked computers system according to the present invention.
Figure 2:
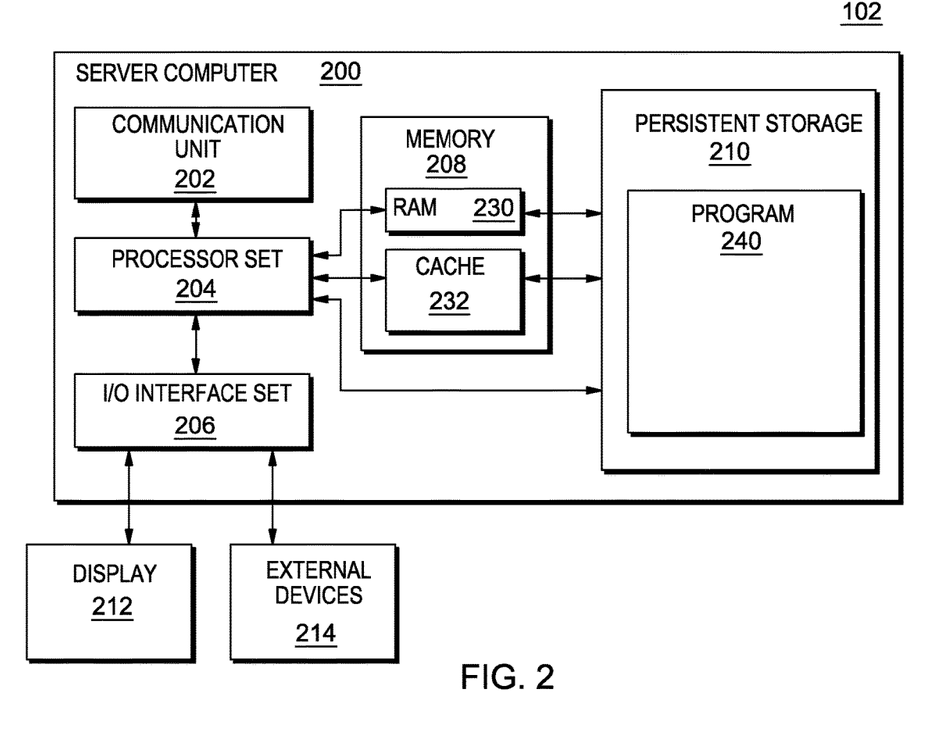
FIG. 2 is a schematic view of a server computer subsystem portion of the first embodiment computer system.

An embodiment of a possible hardware and software environment for software and/or methods according to the present invention will now be described in detail with reference to the Figures. FIGS. 1 and 2 collectively make up a functional block diagram illustrating various portions of distributed data processing system 100, including: server computer sub-system (that is, a portion of the larger computer system that itself includes a computer) 102; client computer sub-systems 104, 106, 108, 110, 112; communication network 114; server computer 200; communication unit 202; processor set 204; input/output (i/o) interface set 206; memory device 208; persistent storage device 210; display device 212; external device set 214; random access memory (RAM) devices 230; cache memory device 232; and program 240.

As shown in FIG. 2, server computer sub-system 102 is, in many respects, representative of the various computer sub-system(s) in the present invention. Accordingly, several portions of server computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 240 is a collection of machine readable instructions and/or data.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Some further comments on processor set 204 will now be made. The processors of processor set 204 have logic in, and/or on, with the logic being in the form of hardware, software and/or firmware. This logic will be discussed at length, below, in connection with FIG. 4, but it is pointed out here that this logic controls the operations of the processor itself, and is not deployed and used like the logic of, say, application software that is typically stored on a disk storage medium until it is used. In this embodiment, the core co-processor logic of processor set 204 is in the form of hardware, the managing of co-processor part is in firmware/software, and the application using the co-processor is software.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
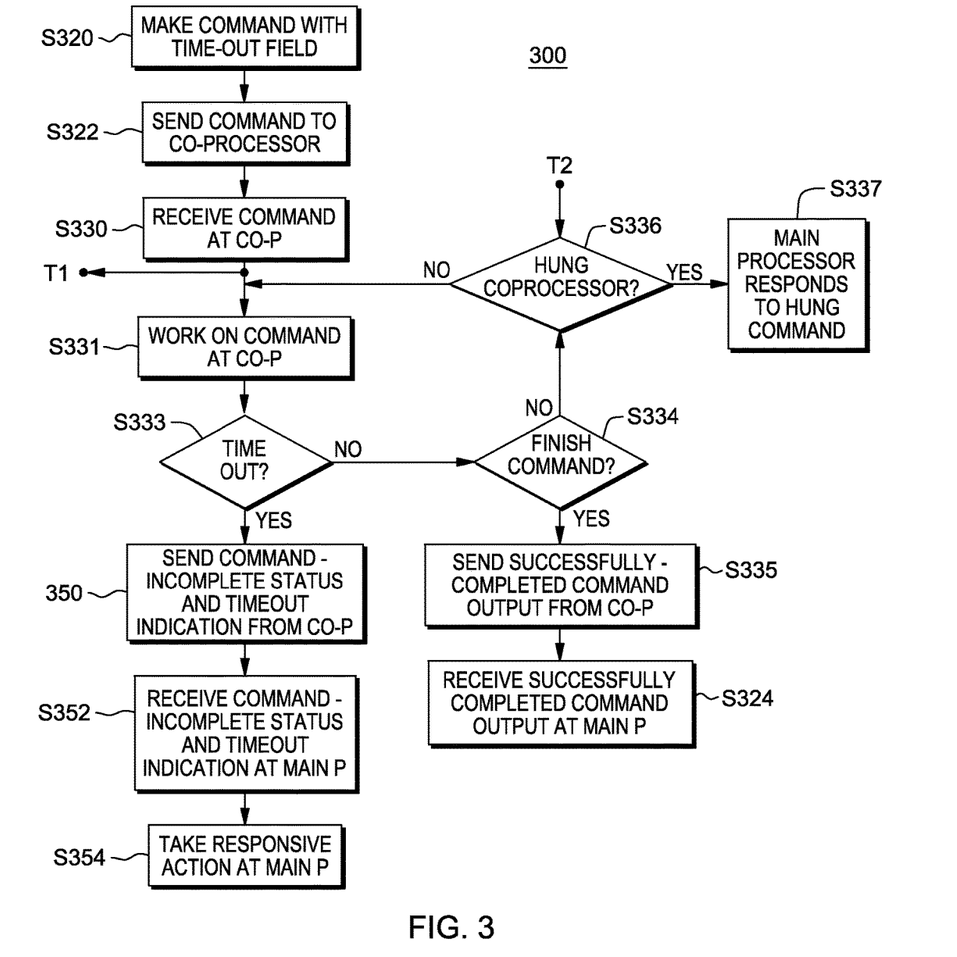
FIG. 3 is a flowchart showing a first method performed, at least in part, by the first embodiment networked computers system.
Figure 4:
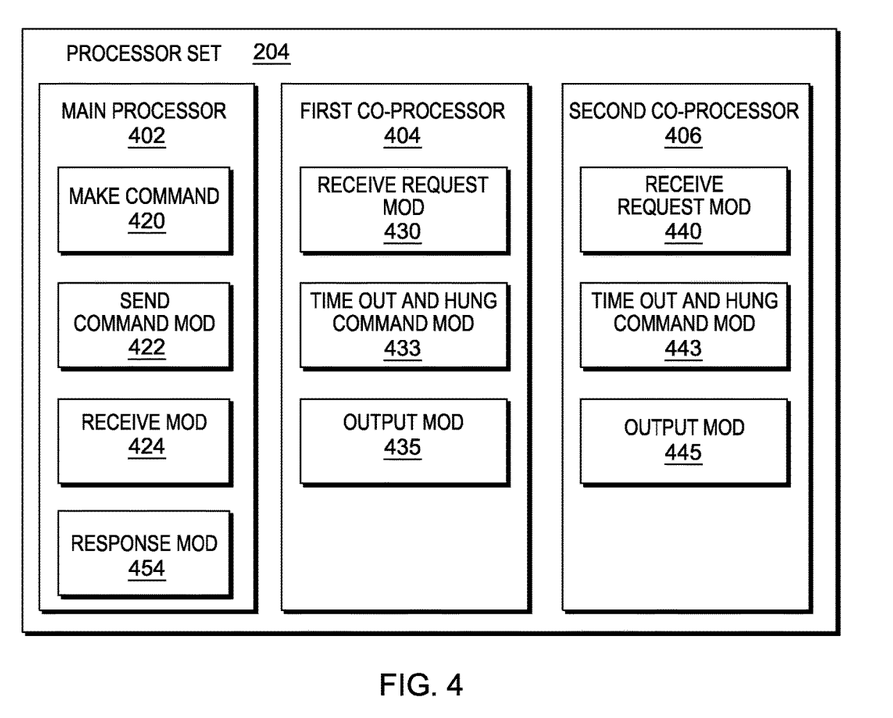
FIG. 4 is a schematic view of a portion of the first embodiment system.
Figure 8:
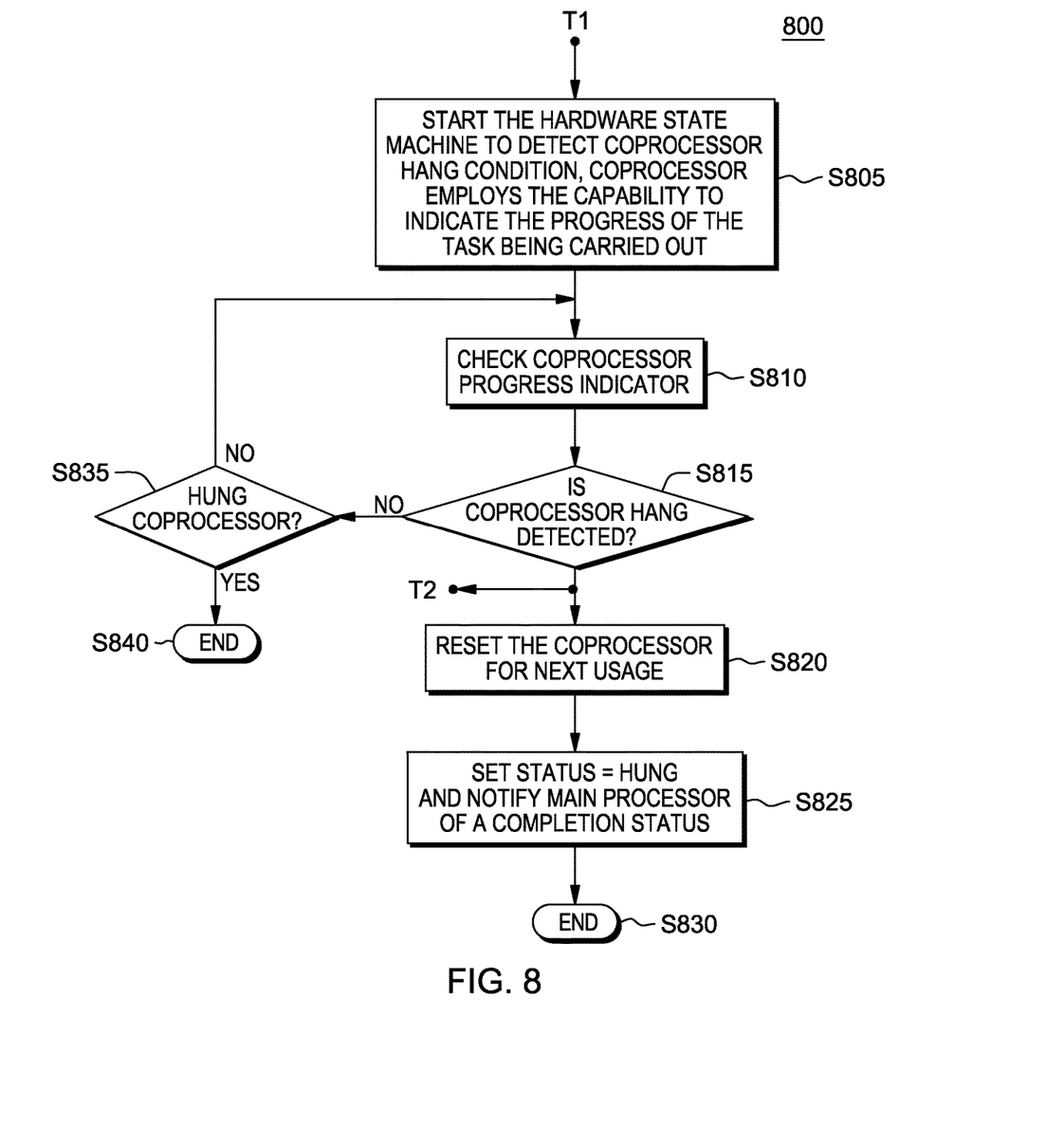
FIG. 8 is a flowchart showing a second method performed, at least in part, by the first embodiment networked computers system.

FIGS. 3 and 8 respectively show flow charts, 300 depicting first and 800 depicting second methods according to the present invention. FIG. 4 shows processor set 204 for performing at least some of the method steps of flow chart 300. This method and associated software will now be discussed, over the course of the following paragraphs, with extensive reference to FIGS. 3 and 8 (for the method step blocks) and FIG. 4 (for the software blocks). As shown in FIG. 4, processor set 204 includes: main processor 402, first co-processor 404 and second co-processor 406. The method of FIG. 3 will be discussed first, followed by a discussion of the method of FIG. 8.

Processing begins at step S320, where make command module ("mod") 420 of main processor 402 makes a command that includes a time out field (also called time out information or time out value). The command is to be directed to first co-processor 404. This time out value indicates how much time may pass before the command is considered to have "timed out." This possible "timing out" is different from the command "failing." To explain: (i) "failing" means that there is some problem in substantively executing the command; and (ii) "timing out" means that the command is taking too long to execute, and not that a problem has been encountered. Typically the timeout value will be specified in microseconds, for a given unit of input text, and it may be specified in the specification documents related to the co-processor. The user will have to calculate a suitable timeout value for his command based on the information given in the specification document and the amount of input being passed to the co-processor. The typical timeout values for various co-processor operations may be specified in the specification document associated with the co-processor.

Processing proceeds to step S322, where send command mod 422 of main processor 402 sends the command to first co-processor 404. In this embodiment, the send operation is similar to conventional command send operations in currently conventional main/co-processor architecture processor sets, except that the command has a timeout value attached. Alternatively, as will be discussed, below, in the Further Comments And/Or Embodiments sub-section of this Detailed Description section, the command may be intercepted so that a "watchdog timer" can handle the timeout aspect of the command.

Processing proceeds to step S330, where receive request mod 430 of first co-processor 404 (similar to mod 440 of second co-processor 406) receives the command from main processor 402.

Processing proceeds to step S331, where the first co-processor 404 works on the command from the main processor 402. If the command is not timed out (that is, the timeout threshold value has not yet been exceeded) then the command should be fully performed in a time interval that is shorter than the timeout value previously put into the command itself at step S320. However, as will be seen, below, in this example, the command is not fully performed prior to the timeout interval specified by the timeout value.

For example, typically cryptography operations, encryption and decryption may take tens of microseconds to complete with worst case being a few milliseconds.

Processing proceeds to step S333, where timeout and hung command mod 433 (second co-processor 406 includes similar mod 443) determines whether or not the time out value specified in the command has been exceeded. If a timeout has occurred (Y), processing proceeds to step S350. This detection of a timeout condition is one example of detection of a "command execution problem condition." If a timeout has not occurred (N), processing proceeds to step S334.

When processing proceeds to step S350, mod 433 sends out a timed out command indication signal. This is an example of a "command execution problem indication." Processing proceeds to step S352, where receive mod 424 of main processor 402 receives the timed out command indication signal. Processing proceeds to step S354, where response mod 454 of main processor 402 takes responsive action. Some possible responsive actions will be discussed, below, in the Further Comments And/Or Embodiments sub-section of the Detailed Description section.

As noted above, if at step S333 a timeout condition has not occurred (N), processing continues to step S334. When processing proceeds to step S334, mod 433 (second co-processor 406 includes a similar mod 443) determines whether the command has been completed by first co-processor 404. If the command has been finished by co-processor 404 (Y), then processing continues to step S335, otherwise processing loop back to S331.

When processing proceeds to step S335, output mod 435 (second co-processor 406 includes a similar mod 445) of first co-processor 404 sends output generated by the execution of the completed command, and an appropriate completion status by one of the earlier shown completion methods. In this branch of method 300, processing concludes at step S324, where mod 424 of main processor 402 receives the completion status and command outputs from the successfully completed command, as is currently conventional for successful completed commands.

FIG. 8 shows a second method 800 according to the present invention. While foregoing method 300 related to timeout of co-processor commands, method 800 of FIG. 8 is related to notifying the main processor when a co-processor command becomes subject to a hung co-processor (this is sometimes herein referred to as a "hung command"). Co-processor hang can occur for a variety of reasons, such as: (i) some input parameters that hang a co-processor hardware state machine (a very sophisticated co-processor design may perform all error checking on input parameters and return error, if required, before starting but it is not always the case that such sophisticated error checking will be present); and/or (ii) deadlock creation inside co-processor hardware due to possible hardware bug(s) or timing related issues. Co-processor hang means the hardware is not progressing, it could be either due to deadlock or livelock, and, hence, the main processor that has queued the work isn't getting any response/status back. Other possible causes of co-processor hang are: (i) a hardware bug; and/or (ii) some complex parallel processing inside the co-processor microcode (state machine) which creates deadlock/livelock situation, and, hence, gives the appearance of a hang to the "outside world" (that is, main processor and its associated software). Coprocessor hang is another example of a "command execution problem condition."

The respective methods of flowcharts 300 and 800 are mutually independent in that: (i) some embodiments check for timeout conditions (method 300 is an embodiment of this), but not hung command conditions; and (ii) other embodiments only check for hung command conditions (method 800 is an embodiment of this). However, this embodiment, currently under discussion, checks for both timeout conditions (in the method of flowchart 300 of FIG. 3) and hung command conditions (in the method of flowchart 800 of FIG. 8). In order to accomplish this: method 300 has blocks S336 and S340 to end method 300 when method 800 encounters a co-processor hang condition; and (ii) method 800 has blocks S835 and S840 to end method 800 when method 300 completes the task or times out on the task.

For method 800, processing begins at step S805, where hardware state machine in co-processor 404 begins monitoring for existence of a co-processor hang condition in first co-processor 404. During this monitoring, a progress indicator of the first co-processor indicates the progress of the task (or command) that has been sent by the main processor 402 for co-processor execution.

Processing proceeds to step S810, where the hardware state machine checks the progress indicator.

Processing proceeds to step S815, where the hardware state machine checks to determine whether there is a hang condition in first co-processor 404. If a hang condition is detected then processing proceeds to steps S820, S825 and S830. At step S820 co-processor is reset for next usage. At step S825, main processor is notified that the command has been completed, on condition that the progress indicator indicates a condition of hung command. In this way, the main processor will "know" if it has a command that it still must perform or re-delegate.

If a co-processor hang condition is not detected at step S815, then processing generally loops back to step S810 so that the command can continue to execute on the first co-processing (barring any timeout conditions or command successful completion which may be determined at step S835, as mentioned above).

Figure 9:
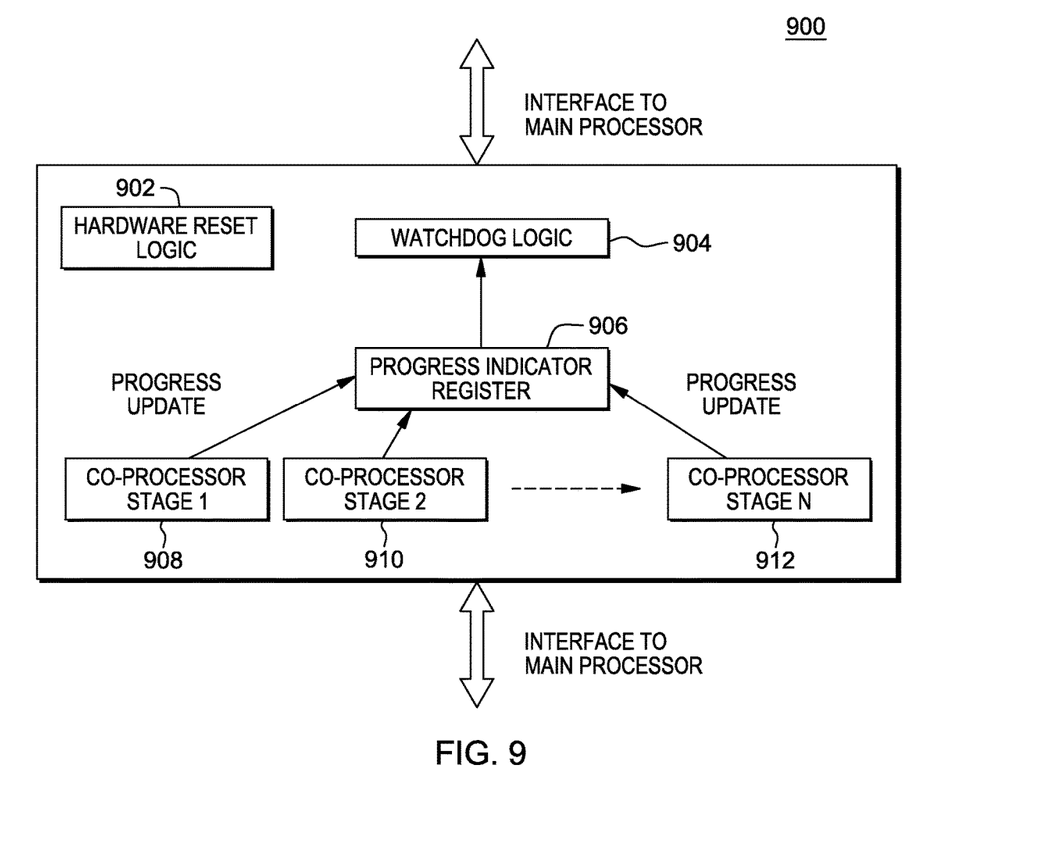
FIG. 9 is a diagram showing a progress indicator module suitable for use in various embodiments of the present invention.

Some further explanation of detection of co-processor hang (also herein called "insufficient progress in executing the command by the co-processor") will now be provided with reference to FIG. 9. FIG. 9 shows progress indicator module 900, including: hardware reset logic sub-module 902; watchdog logic 904; progress indicator register 906; and co-processor stages 908, 910, 912. As shown in FIG. 9, these components interface with the main processor. Module 900 includes multiple stages of processing. For each task, the work flow must be passed through each stage 908, 910, 912 successfully. After successful completion of task at each stage 908, 910, 912, progress indicator register 906 increments its counter. In parallel, watchdog logic 904 keeps checking this progress indicator register to see if there is continuing forward progress on an ongoing basis. The watchdog logic time interval can be adjusted and is implementation dependent. If watchdog logic 904 determines that there is no forward progress, it would declare the task hung because of the insufficient progress.

III. Further Comments and/or Embodiments

Some embodiments of the present disclosure recognize that there are two main issues for users of co-processor hardware. The first issue for users of co-processor hardware is the non-deterministic nature of co-processor command execution. In this case, the main processor may have to wait for an extended period of time for the co-processor command to finish when the co-processor operation is hung or taking a long time to complete. To overcome the non-deterministic nature of co-processor operation, the software has to use timers and send additional commands to the co-processor to get it back to a "sane" state. An example is an asynchronous co-processor terminate command. The second issue for users of co-processor hardware is the non-transactional nature of the co-processor command execution. In this case, the work assigned to the co-processor should either be successfully completed or fail with an error, but current operations can cause additional software issues.

Some embodiments of the present disclosure further recognize that the above-mentioned issues and characteristics can potentially make the co-processor unfit for use in time sensitive software or hardware based environments, such as a RTOS (real time operating system). The current method of co-processor command execution does not fit well for time sensitive environments. One such environment would be a RTOS running in main processor using the co-processor to offload some work. The RTOS has strict latency requirements and, by design, is sensitive to the timeliness of the work being done. RTOS environments expect a response back within a given time, so that they can take corrective action, if needed.

Some embodiments of the present disclosure may include one, or more, of the following features, characteristics and/or advantages: (i) describes a framework for providing time bound execution of co-processor commands; (ii) provides a means for the software to provide a relevant timeout value as part of the co-processor command; and/or (iii) helps bring in the timeliness, deterministic and transactional nature of the co-processor command execution, so that the co-processors can be better exploited in time sensitive environments.

Some embodiments of the present disclosure may have one, or more, of the following features, characteristics and/or advantages: (i) provide a field in the co-processor command block for the software to give a relevant timeout value; (ii) provide the capability in the co-processor hardware to detect hung commands, asynchronously terminate the command, and return an appropriate fail status to the software; and/or (iii) provide the capability in the co-processor to monitor the execution time of a command. If the execution command exceeds the timeout value, then terminate the command and return an appropriate fail status to the software. Note that a command failure is different than a failure due to a timeout condition, or failure due to a hang condition. The command failure can happen for variety of reasons like the input data not following certain alignment restrictions as defined by the co-processor specification or the user not providing enough target space as part of the command, which results in exhausting the total target space provided as part of the command. Generally these failure conditions will be mentioned in the specification document so that the user can associate a failure code returned by the co-processor with the condition mentioned in the specification document and take corrective actions. Similarly the specification document should provide a new failure code for timeout condition which is distinct from any other failure codes.

Some embodiments of the present disclosure provide the ability of the co-processor to detect hung commands. This relieves the software from working on hung commands. If a command is hung, the co-processor detects the hung condition, internally terminates it, and returns an appropriate error code back to the software. This causes the co-processor to provide a transaction oriented interface to the main processor. Here, either the command succeeds or fails, if it fails, the co-processor is in a clean state ready to accept the next co-processor command, without the software having to issue a command termination. This helps address the non-transactional behavior of the co-processor.

Some embodiments of the present disclosure provide the co-processor the ability to associate a timeout for each command. This relieves the software from managing these timers. This also relieves the software from issuing a command termination after waiting for a timeout condition. The software can issue the co-processor command with the relevant timeout, and if the co-processor cannot complete the command in the given time, it will terminate the command and return the appropriate failure code back to the software. This again helps the co-processor in providing a transaction oriented interface to the main processor. Here the command either succeeds or fails. If the command fails, the co-processor enters a clean up state, and then is ready to accept the next command from the software. This also helps in time sensitive use cases, for example, in RTOS.

The possible features described in the two previous paragraphs may: (i) necessitate adding extra circuits and complexity to the co-processor hardware; (ii) add to the processor size; and/or (iii) increase the cost of the co-processor. In some embodiments of the present disclosure, similar results can be achieved, without making any changes to the co-processor, by using a privileged or super-privileged kernel (or hypervisor) to intercept the co-processor commands issued by the software. The kernel or hypervisor: (i) is an example of a software implementation; (ii) consumes the timeout value given by the software as part of the co-processor command; (iii) starts a watchdog timer thread (executed on the main processor); and (iv) issues the command to the co-processor without the timeout (with the timeout now being unnecessary because it has been effectively replaced by the watchdog timer thread). This method calls for a co-processor watchdog framework in kernel/hypervisor that will issue the co-processor command termination in the event the command gets hung or times out. The embodiments described in this paragraph do not necessarily require any changes in the co-processor hardware, but these embodiments still relieve the software from processing timers and/or hung commands.

Finally, if the main processor/software ignores the timeliness of the work assigned, it can pass a special value to the time out field (−1 or NULL, for example) that would cause the co-processor not to use the watchdog timers. Here, the main processor would still receive current co-processor behavior, but would not have to wait for the co-processor return command.

Some embodiments of the present disclosure selectively terminate the hung command without affecting the execution of other commands in the co-processor.

Figure 5:
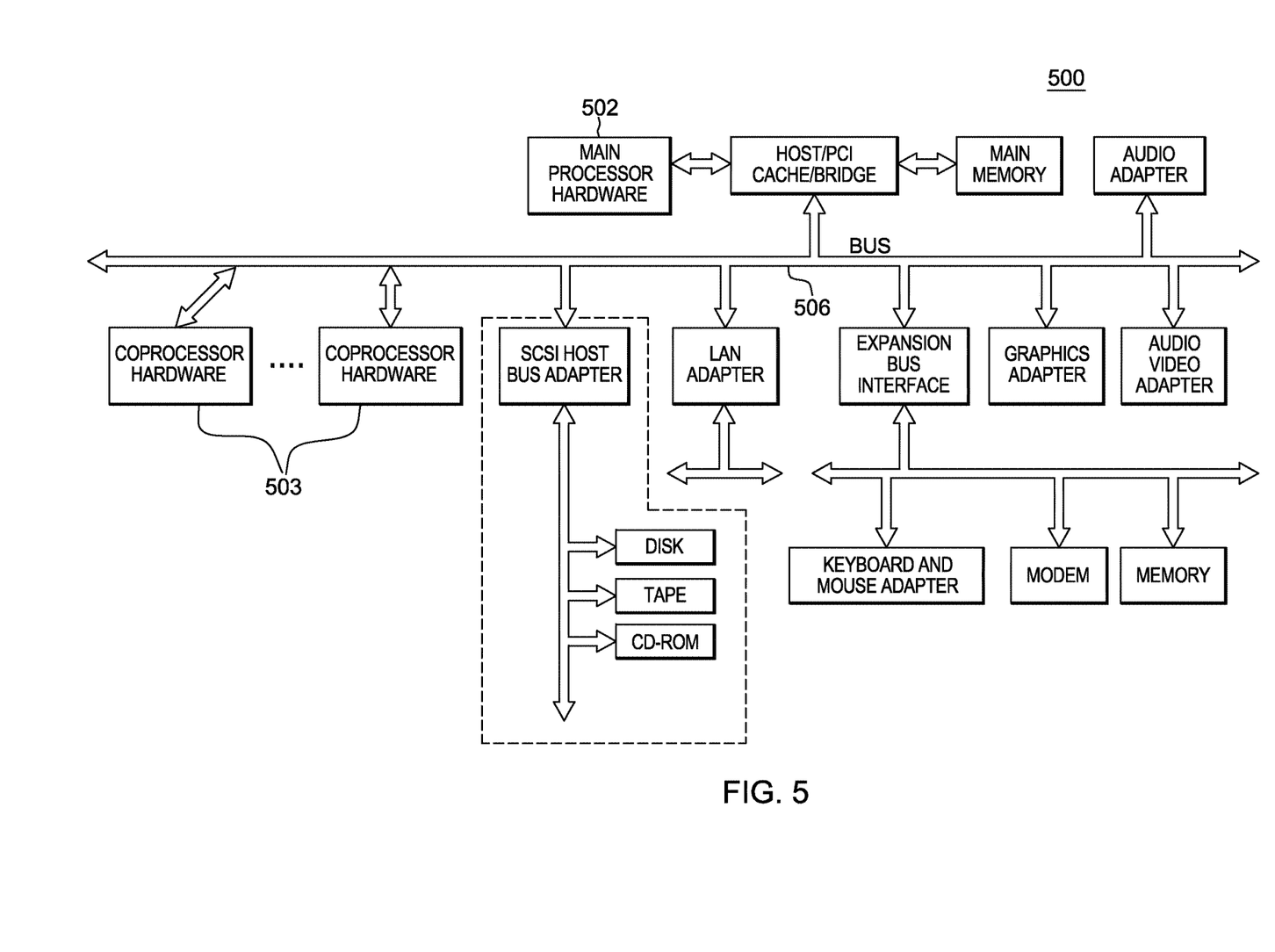
FIG. 5 shows a schematic view of a second embodiment of a system according to the present invention.
Figure 6:
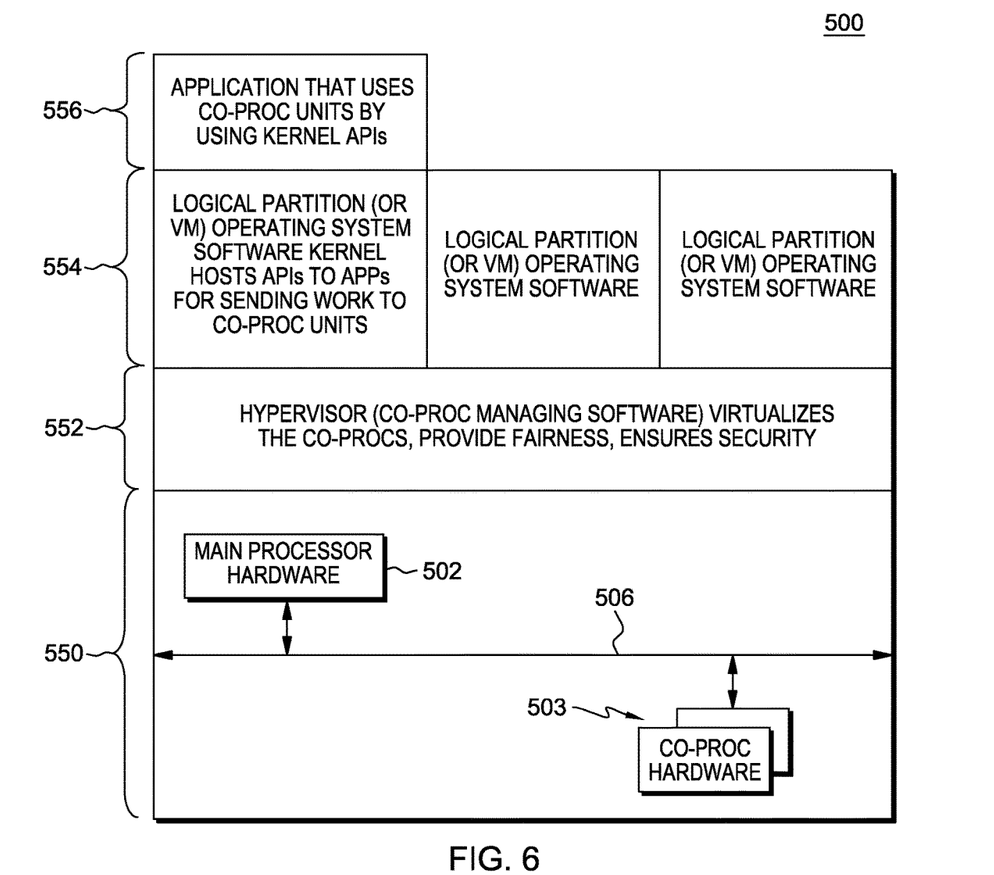
FIG. 6 shows another schematic view of the second embodiment.
Figure 7:
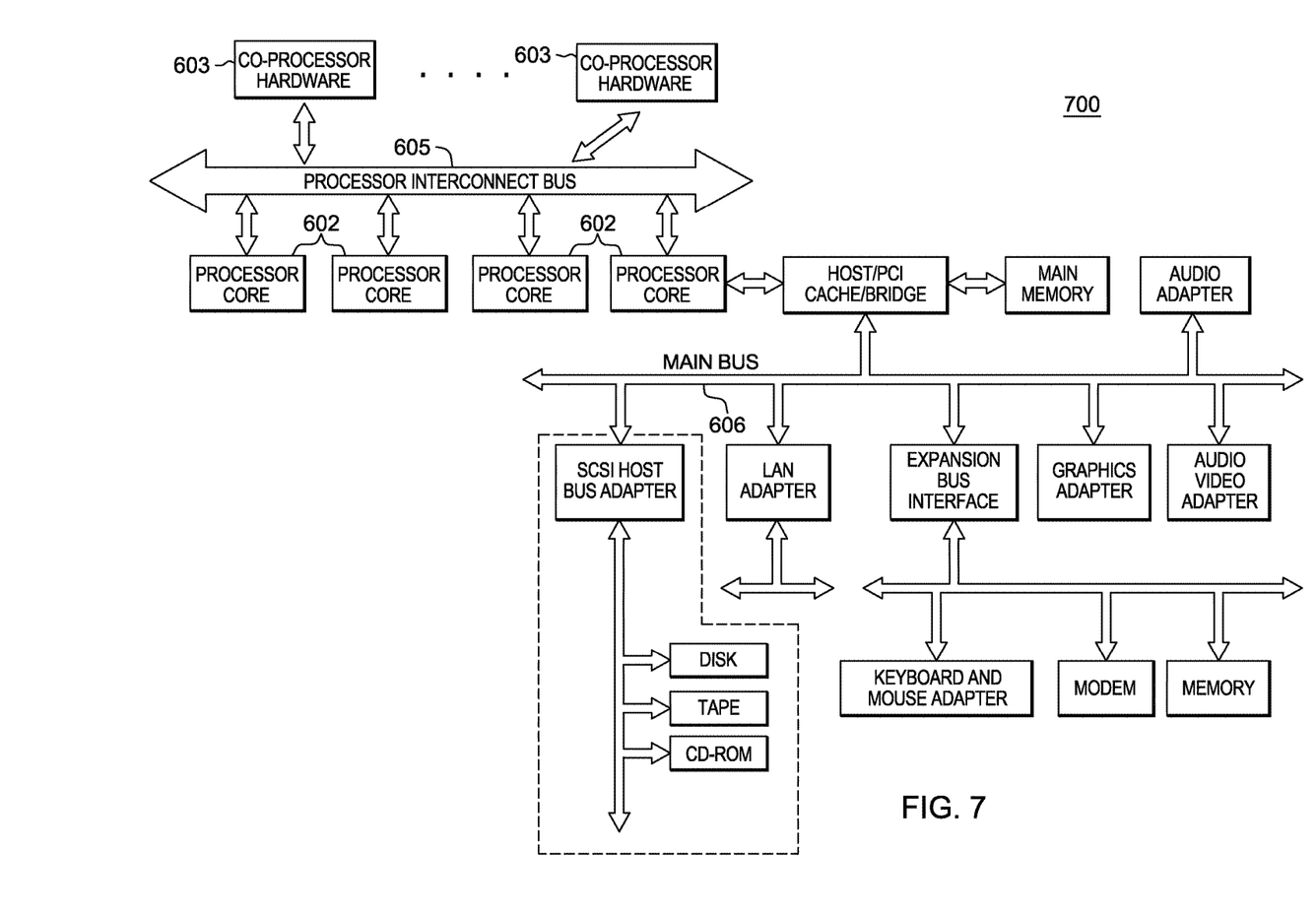
FIG. 7 shows a schematic view of a third embodiment of a system according to the present invention.

FIGS. 5 and 6 show computer system 500 including: main processor hardware 502; co-processors 503; bus 506; hardware layer 550; firmware layer 552; kernel layer 554 and application software layer 556. System 500 demonstrates: (i) on possible bus architecture for connecting, in data communication, the main processor and the co-processors; and (ii) how the machine logic controlling time outs for various embodiments of the present disclosure may be located at any, or all, of the hardware, firmware, and/or software layers.

FIG. 6 shows computer system 700 including: main processor cores 602; co-processors 503; processor interconnect bus 605; and main bus 606. System 600 demonstrates: (i) an alternative bus structure that includes main bus 606 and processor interconnect bus 606; and (ii) some embodiments of the present invention have multiple main processor cores.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Machine logic set: machine logic which is implemented as software, hardware, and/or firmware.

What is claimed is:

1. A processor set including a main processor and a first co-processor controlled by the main processor for the purpose of offloading computationally intensive work, with the processor set further comprising:
a first machine logic set, structured and/or programmed for use by the main processor, to send, by the main processor to the first co-processor, a command including a timeout field, wherein the timeout field comprises a timeout value;
a second machine logic set, structured and/or programmed for use by the first co-processor, to detect, by the first co-processor, an execution problem condition corresponding to insufficient progress in executing the command by the co-processor due to co-processor hang or time being taken to execute the command by the co-processor exceeding the timeout value included in the command;
a third machine logic set, structured and/or programmed for use by the first co-processor, to send, by the first co-processor, a command execution problem indication responsive to detection of the execution problem condition; and
a fourth machine logic set structured and/or programmed to, responsive to the command execution problem indication, asynchronously terminate execution of the command, sent by the main processor, by the first co-processor.

2. The processor set of claim 1 wherein:
the second machine logic set includes a watchdog timer that is separate from the first co-processor.

3. The processor set of claim 2 further comprising:
a fourth machine logic set structured and/or programmed to pass a special value to the timeout field, wherein the special value precludes use of the watchdog timer.

4. The processor set of claim 1 wherein:
the second machine logic set includes a progress indicator module which includes a progress indicator register and a watchdog logic sub-module.

5. The processor set of claim 4 further comprising:
a hypervisor to intercept the command, start a watchdog timer thread for execution on the main processor, and issue the command to the co-processor without the timeout value.

6. The processor set of claim 1 further comprising:
a fourth machine logic set structured and/or programmed to, responsive to the command execution problem indication, return a command fail status which indicates by a uniquely corresponding failure code that command failure is due to a timeout condition.

7. The processor set of claim 1 wherein the main processor and first co-processor are included in a single processing unit.

8. The processor set of claim 7 wherein the single processing unit further includes a plurality of additional co-processors.

9. The processor set of claim 1 wherein:
the processor set operates in a time-sensitive real time operating system environment.

* * * * *